US011100236B2

(12) United States Patent
Erden

(10) Patent No.: US 11,100,236 B2
(45) Date of Patent: Aug. 24, 2021

(54) DISTRIBUTED DATA SECURITY

(71) Applicant: Seagate Technology LLC, Cupertino, CA (US)

(72) Inventor: Mehmet Fatih Erden, Saint Louis Park, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 246 days.

(21) Appl. No.: 16/452,794

(22) Filed: Jun. 26, 2019

(65) Prior Publication Data

US 2020/0410112 A1 Dec. 31, 2020

(51) Int. Cl.
*G06F 21/60* (2013.01)
*H04L 9/08* (2006.01)

(52) U.S. Cl.
CPC .......... *G06F 21/602* (2013.01); *H04L 9/0819* (2013.01); *H04L 9/0869* (2013.01)

(58) Field of Classification Search
CPC .... G06F 21/602; H04L 9/0819; H04L 9/0869
See application file for complete search history.

(56) References Cited

U.S. PATENT DOCUMENTS

| 7,404,089 | B1 | 7/2008 | Campagna et al. |
| 7,653,689 | B1 | 1/2010 | Champagne et al. |
| 8,095,923 | B2 | 1/2012 | Harvey et al. |
| 84,237,801 | | 4/2013 | Plotkin et al. |
| 9,098,519 | B2 | 8/2015 | Pavlov et al. |
| 9,459,955 | B2 * | 10/2016 | Tuers ................... G06F 11/1012 |
| 9,769,128 | B2 | 9/2017 | Gross et al. |
| 9,876,991 | B1 | 1/2018 | Ray et al. |
| 10,346,319 | B1 * | 7/2019 | Thomas .............. G06F 21/6272 |
| 2002/0018561 | A1 * | 2/2002 | Emelko ................... H04L 9/304 380/28 |
| 2005/0283537 | A1 | 12/2005 | Li et al. |
| 2007/0100834 | A1 | 5/2007 | Landry et al. |
| 2011/0035645 | A1 * | 2/2011 | Yang ................... G06F 12/0246 714/763 |
| 2014/0270180 | A1 * | 9/2014 | Resch ................. G06F 11/1004 380/282 |
| 2018/0052731 | A1 * | 2/2018 | Grube ................... H04L 9/0894 |

OTHER PUBLICATIONS

Alrowaily, Mohammed and Zhuo, Lu. "Secure Edge Computing in IoT Systems: Review and Case Studies." 2018 IEEE/ACM Symposium on Edge Computing (SEC) (2018): 440-444. USA.

(Continued)

*Primary Examiner* — Ayoub Alata
(74) *Attorney, Agent, or Firm* — Westman, Champlin & Koehler, P.A.

(57) ABSTRACT

A method includes partitioning a received data chunk into first and second data sectors to be stored in respective first and second store units. The method also includes generating first and second random keys. The method further includes encrypting the first data sector with the second random key, and encrypting the second data sector with the first random key. The first and second random keys are encoded with channel codes. Thereafter, the first encoded random key is appended to the first encrypted data sector to obtain first appended data, and the second encoded random key is appended to the second encrypted data sector to obtain second appended data.

17 Claims, 10 Drawing Sheets

(56) References Cited

OTHER PUBLICATIONS

John Edwards. "Edge Computing Security Dos and Don'ts." NETWORKComputing, Nov. 21, 2018, https://www.networkcomputing.com/network-security/edge-computing-security-dos-and-donts.
Trimananda, Rahmadi et al. "Vigilia: Securing Smart Home Edge Computing." 2018 IEEE/ACM Symposium on Edge Computing (SEC) (2018): 74-89.
Endler, Markus et al. "An approach for secure edge computing in the Internet of Things." 2017 1st Cyber Security in Networking Conference (CSNet) (2017): 1-8.

\* cited by examiner

DISTRIBUTED DATA SECURITY

SUMMARY

In one embodiment, a method is provided. The method includes partitioning a received data chunk into first and second data sectors to be stored in respective first and second store units. The method also includes generating first and second random keys. The method further includes encrypting the first data sector with the second random key, and encrypting the second data sector with the first random key. The first and second random keys are encoded with channel codes. Thereafter, the first encoded random key is appended to the first encrypted data sector to obtain first appended data, and the second encoded random key is appended to the second encrypted data sector to obtain second appended data.

In another embodiment, an apparatus is provided. The apparatus includes an interface and a control circuit. The control circuit receives a data chunk via the interface, and partitions the received data chunk into first and second data sectors to be stored in respective first and second store units. The control circuit also generates first and second random keys, and encrypts the first data sector with the second random key, and encrypts the second data sector with the first random key. Further, the control circuit encodes the first and second random keys with channel codes. The control circuit then appends the first encoded random key to the first encrypted data sector to obtain first appended data, and appends the second encoded random key to the second encrypted data sector to obtain second appended data.

In yet another embodiment, a method is provided. The method included partitioning a received data chunk F into a plurality of X data sectors, with an $i^{th}$ data sector being represented by $F_i$. The plurality of X data sectors are to be stored in different ones of X distributed store units. The method also includes generating X different random keys $P_1$, $P_2$, ... $P_x$, with an $i^{th}$ random key of the X different random keys being represented by $P_i$. The method further includes encrypting $F_i$ with X−1 different ones of the random keys other than the $i^{th}$ random key to obtain an $i^{th}$ encrypted data sector $F_i'$. $P_i$ is encoded with channel codes to obtain an $i^{th}$ encoded random key $P_i'$. Thereafter, $P_i'$ and $F_i'$ are appended to obtain $i^{th}$ appended data $P_i'F_i'$.

Other features and benefits that characterize embodiments of the disclosure will be apparent upon reading the following detailed description and review of the associated drawings.

DETAILED DESCRIPTION OF ILLUSTRATIVE EMBODIMENTS

Figure 1:
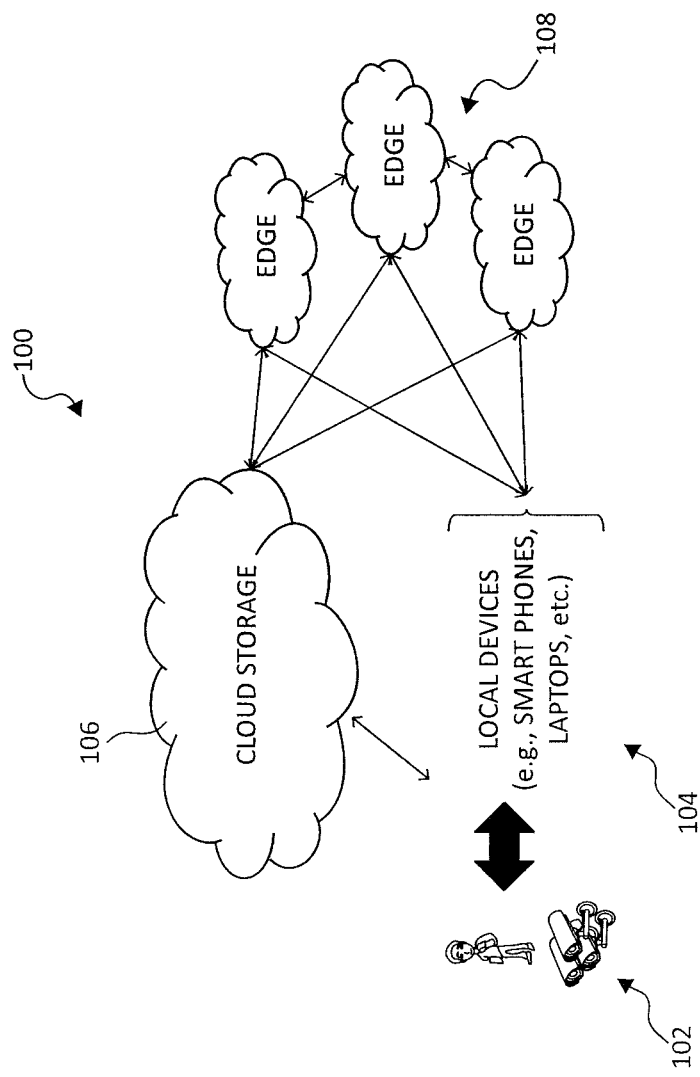
FIG. 1 is a diagrammatic illustration of a data management system in which embodiments of the disclosure may be used.

Embodiments of the disclosure relate to distributed data security in, for example, edge applications.

Currently, local data storage devices with limited storage space and compute power work on signals that are either being collected or already collected by various sensors. Examples of such local devices include smart phones, laptops, thumb drives, external drives, the Internet of Things (IoT), etc. Due the limited storage capacity of such local devices, data may be sent to the "cloud" where the overall storage system is optimized in terms of capacity, power and performance. This provides a substantially cheap solution to store large amounts of data.

However, the combination of local storage devices and the cloud has certain problems/limitations. For example, a user may not desire to store certain specific data in the cloud. Further, data stored in the cloud may not be available all the time because of bandwidth limitations. Also, storing all the data locally may not be feasible because it may become very costly and unmanageable. In order to address these problems, new data storage system tiers, called "edge" tiers are emerging. A general description of edge computing is provided below in connection with FIG. 1.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a diagrammatic illustration of a data management system in 100 which embodiments of the disclosure may be used. In the example system 100 of FIG. 1, sensors (e.g., cameras) 102 communicate with local devices (e.g., smart phones, laptops, thumb drives, external drives, the IoT, etc.) 104. Local device may communicate with the cloud 106 and with edge devices 108.

Edge devices 108 may be visualized as application specific storage nodes local to the application(s), with their own sensors, compute blocks, and storage. Eventually, some or all data from edge devices 108 may be stored in the cloud 108, but bandwidth-consuming data flow and computation may be carried out more efficiently within the edges 108 themselves. There can also be peer-to-peer data flow among edges 108. Because of the benefits offered by edge architectures, edge-related applications are increasing at a relatively rapid rate, and have started covering a wide variety of applications. A specific edge-related application is described below in connection with FIG. 2A.

Figure 2A:
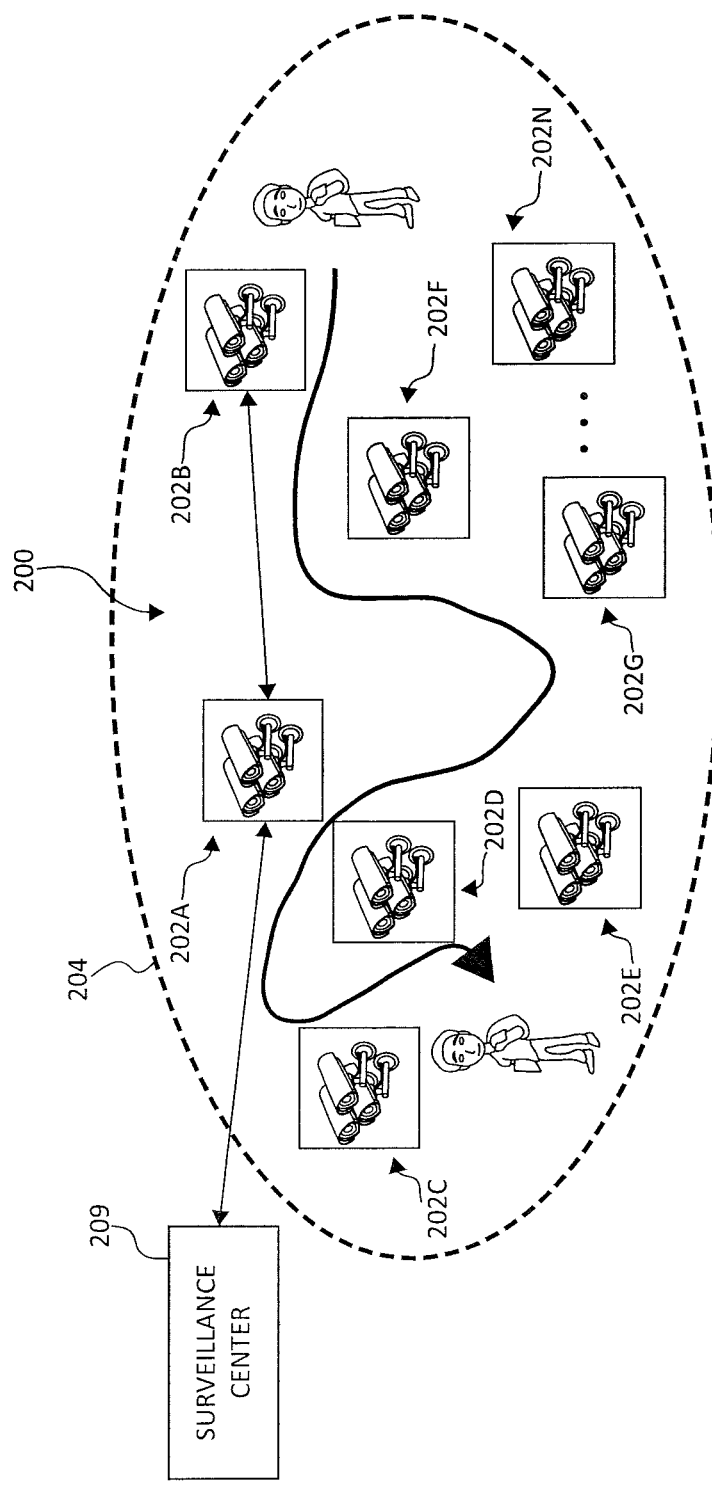
FIG. 2A is a diagrammatic illustration of an example surveillance system for a university campus in which embodiments of the disclosure may be used.
Figure 2B:
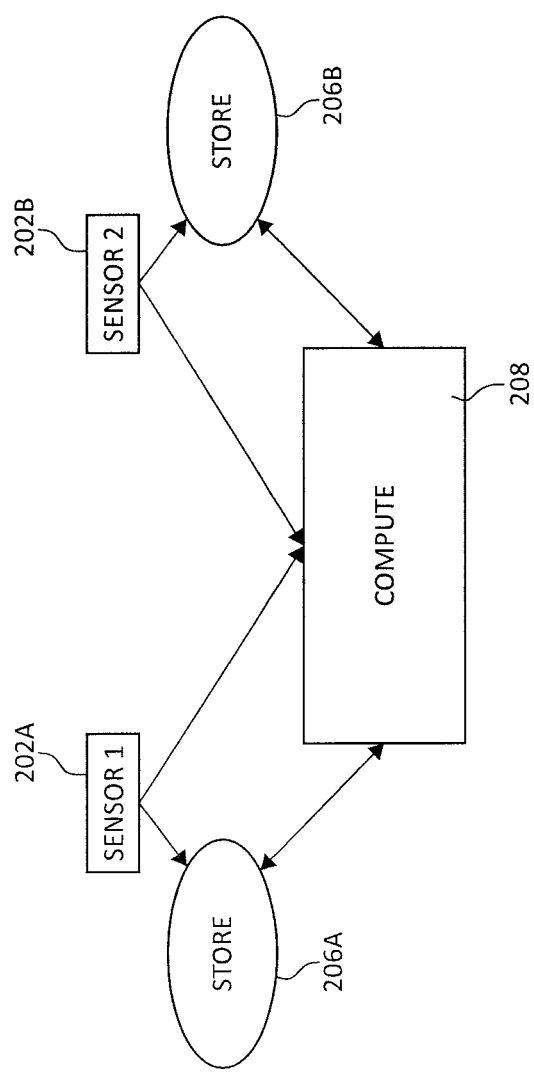
FIG. 2B is a diagrammatic illustration showing sensors, two store units and a compute block that may be employed in the surveillance system of FIG. 2A.

FIG. 2A is a diagrammatic illustration of an example surveillance system 200 for a university campus in which embodiments of the disclosure may be used. Surveillance system 200 includes a plurality of cameras 202A-202N that are mounted at different locations within university campus 204. A purpose of surveillance system 200 may be to observe locations within the targeted premise (the university campus 204 for this example) at any time, record all the data, compute to detect any abnormalities, and report the abnormalities in a timely manner. In order to meet the purpose of the whole system, the edge applications have "store" units used for data storage and a "compute" block to execute computations for a given objective. For illustrative purposes, FIG. 2B shows two sensors (e.g., cameras 202A and 202B in FIG. 2A) connected to two store units 206A and 206B, and a compute block 208. Store units 206A and 206B may be attached to sensors (e.g., cameras 202A and 202B in FIG. 2A) in FIG. 2A, or they can also be located in, for example, a "surveillance center" 209 (of FIG. 2A) along with the compute block 208.

Store units 206A and 206B in FIG. 2B may comprise secure drives to protect user data at a drive level. Security algorithms to protect data in transit may also be included. However, an ever growing number of edge nodes in distributed systems increases the risk to data security and its integrity.

As will be described in detail further below, to protect against malicious entities (e.g., hackers), embodiments of the disclosure partition data received from a sensor, encrypt the different partitions with different encryption keys, and send the different partitions to different store units. For example, if an image of a license plate is received from a sensor, that image is partitioned (into two portions, for example) based on predetermined criteria, and the image portions are encrypted using different encryption keys. The different encrypted license plate image portions are then sent to different store units. The malicious entity (e.g., the hacker) will have no information as to which specific store units contain the encrypted license plate image portions. Thus, even if the malicious entity (e.g., the hacker) is somehow successful in decrypting one portion of the license plate data stored in one store unit, the additional portion(s) are still inaccessible.

Example architectures for providing distributed data security in accordance with embodiments of the disclosure are first described in connection with FIGS. 3A-3D. Thereafter, example encryption and decryption embodiments are described in connection with FIGS. 4A and 4B, respectively.

FIGS. 3A-3D are diagrammatic illustrations of example architectures for providing distributed data security in accordance with embodiments of the disclosure. In FIGS. 3A-3D, boxes 302A-302C include distributed data security added on top of the reference architecture in FIG. 2B. Boxes 302A-302C include blocks 304A-304C, which represent functions that involve non-distributed key management (e.g., encryption and protection of encryption keys using non-distributed techniques), and blocks 306A-306C that represent functions that involve distributed key management (e.g., encryption and protection of encryption keys using distributed data security techniques). In some embodiments, "non-distributed data security" and "distributed data security" functionalities may be implemented in the same hardware. In other embodiments, hardware employed to implement "non-distributed data security" functions may be different from hardware employed for implementation of "distributed data security" functions. Encryption and decryption blocks may be implemented in various locations, some of which are shown in FIGS. 3A-3D. Descriptions along with advantages and disadvantages of the different example implementations are provided below.

Figure 3A:
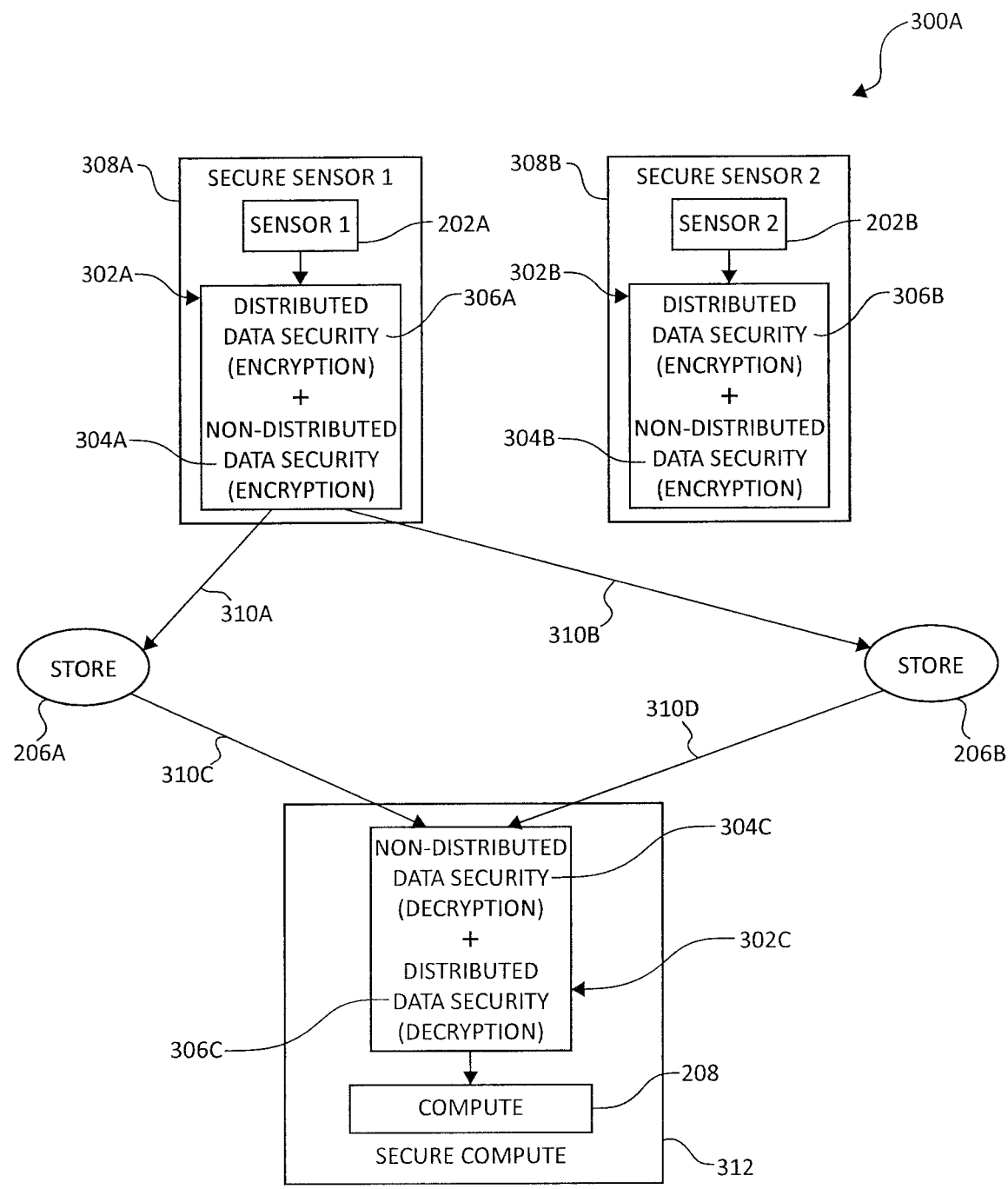
FIGS. 3A-3D are diagrammatic illustrations of example architectures for providing distributed data security in accordance with embodiments of the disclosure.

In the architecture 300A shown in FIG. 3A, encryption is implemented at sensors 202A and 202B. Accordingly, in FIG. 3A, sensor 202A and security functions 302A form secure sensor 308A, and sensor 202B and security functions 302B form secure sensor 308B. In secure sensor 308A, for example, encryption is carried out by security functions 302A, and transmission lines (e.g., secure transmission lines) 310A and 310B are used to transfer the encrypted data to target store units 206A and 206B, respectively. Similar encryption may be carried out in secure sensor 308B. Transmission of encrypted data may also take place from secure sensor 308B to, for example, store units 206A and 206B via transmission lines (e.g., secure transmission lines), which are not shown in the interest of simplification. In some embodiments, store units 206A and 206B may include secure drives for additional security. When the encrypted data is to be used for processing, it is extracted from store units 206A and 206B and sent to secure compute block 312, which includes compute block 208 and security functions 302C, via transmission lines (e.g., secure transmission lines) 310C and 310D, respectively. The encrypted data is decrypted in secure compute block 312 using security functions 302C. Advantages of implementing encryption at sensors 202A and 202B include the following:

Data is encrypted at the source, and distributed.

There is no change made to the store units.

Bandwidth is used efficiently (e.g., the same amount of original sensor data is transmitted from the sensors to the store units for storage, and from the store units to the compute block for processing).

Disadvantages of implementing encryption at sensors 202A and 202B include the following:

Encryption is introduced at a sensor level, which increases the complexity and cost of the sensors.

Security functionality is introduced at different blocks (e.g., the sensor and the compute block), which involves the complexity of aligning the security functionality for the sensor and the compute block.

Figure 3B:
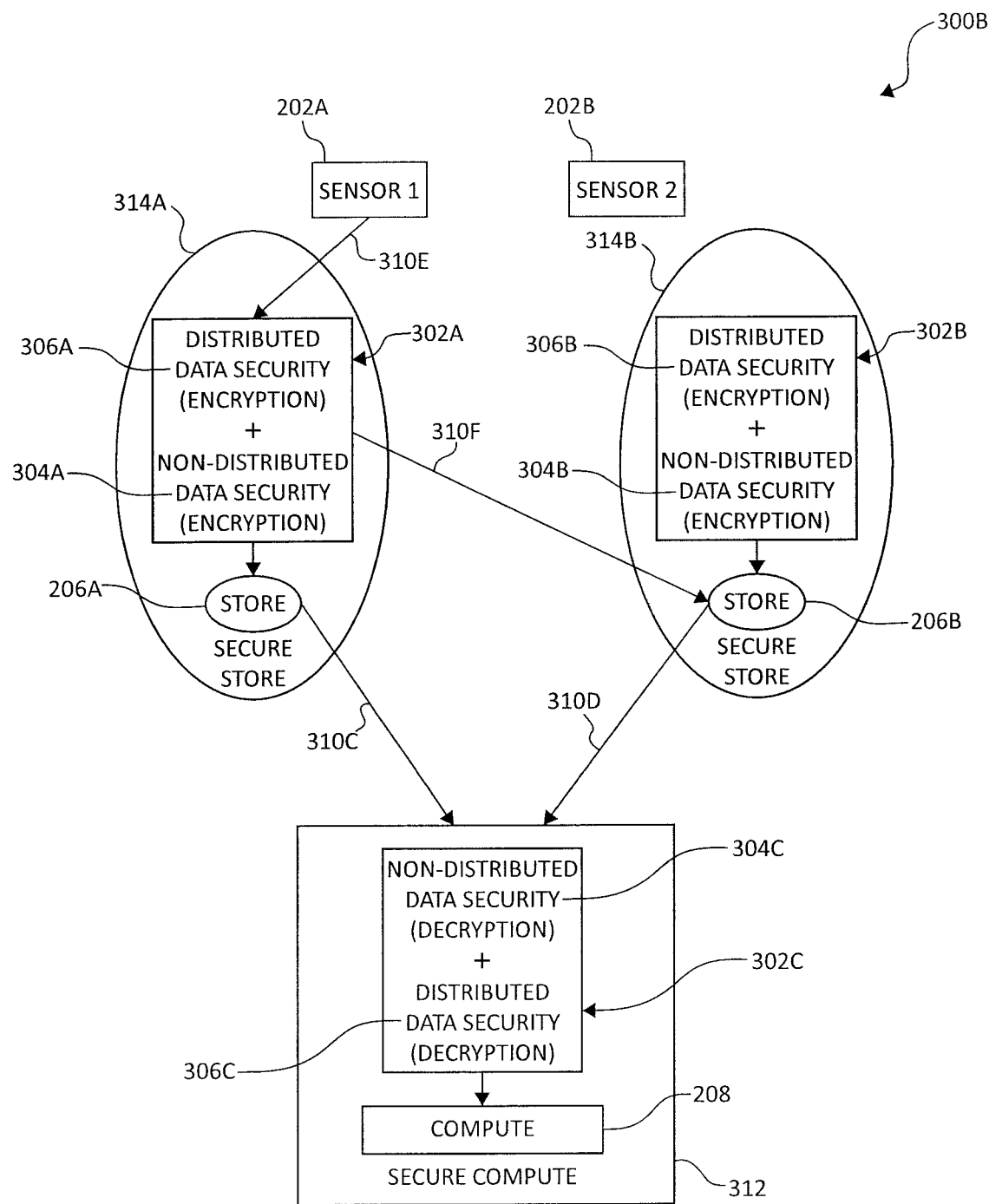

In the architecture 300B shown in FIG. 3B, signals from sensors 202A and 202B are sent to store units 206A and 206B via transmission lines and encryption is carried out at store units 206A and 206B. Accordingly, store unit 206A and security functions 302A form secure store unit 314A, and store unit 206B and security functions 302B form secure store unit 314B. A transmission line (e.g., a secure transmission line) 310E is shown for transmitting signals from sensor 202A to secure store unit 314A. However, in the interest of simplification, no transmission line connection from sensor 202B to any secure store unit (e.g., 314A or 314B) is shown. When encryption of data from sensor 202A is carried out in secure store unit 314A, one portion of the encrypted data may be stored in secure store unit 314A and another portion of the encrypted data may be sent to secure store unit 314B via a transmission line (e.g., a secure transmission line) 310F. As in the case of architecture 300A of FIG. 3A, in architecture 300B shown in FIG. 3B, store units 206A and 206B may include secure drives for additional security. Further, as described above in connection with architecture 300A, when the encrypted data is to be used for processing in architecture 300B shown in FIG. 3B, it is extracted from store units 206A and 206B and sent to secure compute block 312, which includes compute block 208 and security functions 302C, via transmission lines (e.g., secure transmission lines) 310C and 310D, respectively. The encrypted data is decrypted in secure compute block 312 using security functions 302C. Advantages of implementing encryption at store units 206A and 206B include the following:

Sensors are simple devices used only to capture data.
    Encryption is done at store units. Since secure drives already exist, hardware exists at store units for the distributed data security functionality.
    Decryption is carried out at the compute block, where hardware implementation makes sense.

Disadvantages of implementing encryption at store units 206A and 206B include the following:

Whole sensor data is sent through the transmission line without distributed data security, and therefore the sensor data is vulnerable to attack at that point.
    Extra data transmission among store units is employed, which may result in increases in bandwidth.
    Encryption is carried out at store units, which may increase the complexity and cost of the store units.
    Security functionality is introduced at different blocks (e.g., store units and the compute block), which involves the complexity of aligning the security functionality for the store units and the compute block.

Figure 3C:
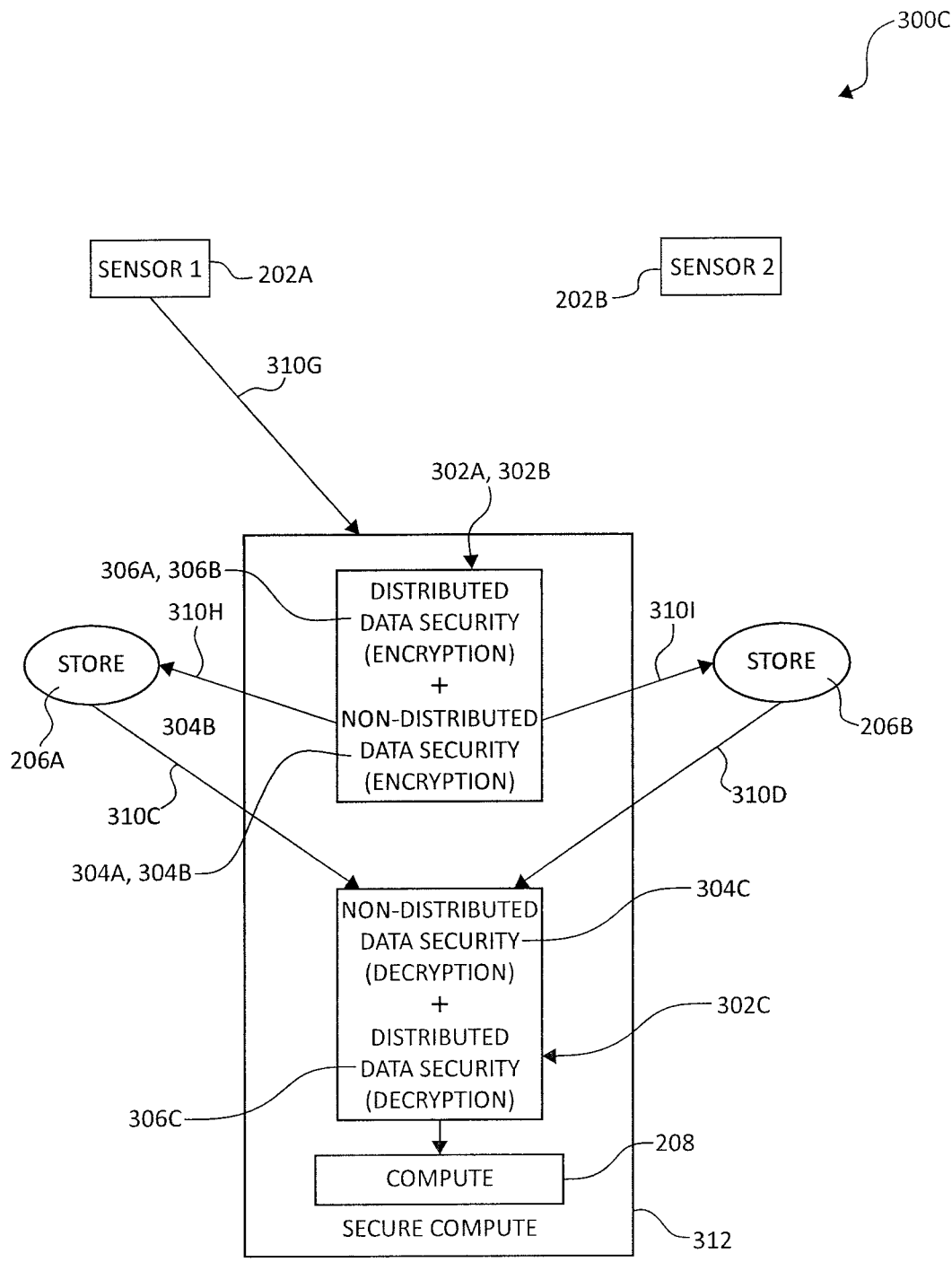

In the architecture 300C shown in FIG. 3C, signals from sensors 202A and 202B are sent to compute block 208 via transmission lines and encryption is carried out at compute block 208. Accordingly, in the embodiment of FIG. 3C, compute block 208, security functions 302A, 302B that carry out encryption, and security functions 302C that carry out decryption form secure compute block 312. A transmission line (e.g., a secure transmission line) 310G is shown for transmitting signals from sensor 202A to secure compute block 312. However, in the interest of simplification, no transmission line connection from sensor 202B to secure compute block 312 is shown. When encryption of data from sensor 202A is carried out in secure compute block 312, one portion of the encrypted data may be sent to store unit 206A via a transmission line (e.g., a secure transmission line) 310H and another portion of the encrypted data may be sent to store unit 206B via a transmission line (e.g., a secure transmission line) 310I. As in the case of architectures 300A of FIG. 3A and 300B of FIG. 3B, in architecture 300C shown in FIG. 3C, store units 206A and 206B may include secure drives for additional security. Further, a described above in connection with architectures 300A and 300B, when the encrypted data is to be used for processing in architecture 300C shown in FIG. 3C, it is extracted from store units 206A and 206B and sent to secure compute block 312 via transmission lines (e.g., secure transmission lines) 310C and 310D, respectively. The encrypted data is decrypted in secure compute block 312 using security functions 302C. Advantages of implementing encryption at compute block 208 include the following:

Sensors and store units are the same as the reference architecture shown in FIG. 2B. All added complexity is at the compute block, and yields an opportunity for hardware optimization in the implementation.

Disadvantages of implementing encryption at compute block 208 include the following:

Whole sensor data is sent through the transmission line without distributed data security, and therefore the sensor data is vulnerable to attack at that point.
    Extra data transmission between store units and the compute block is employed, which may result in increases in bandwidth.

Figure 3D:
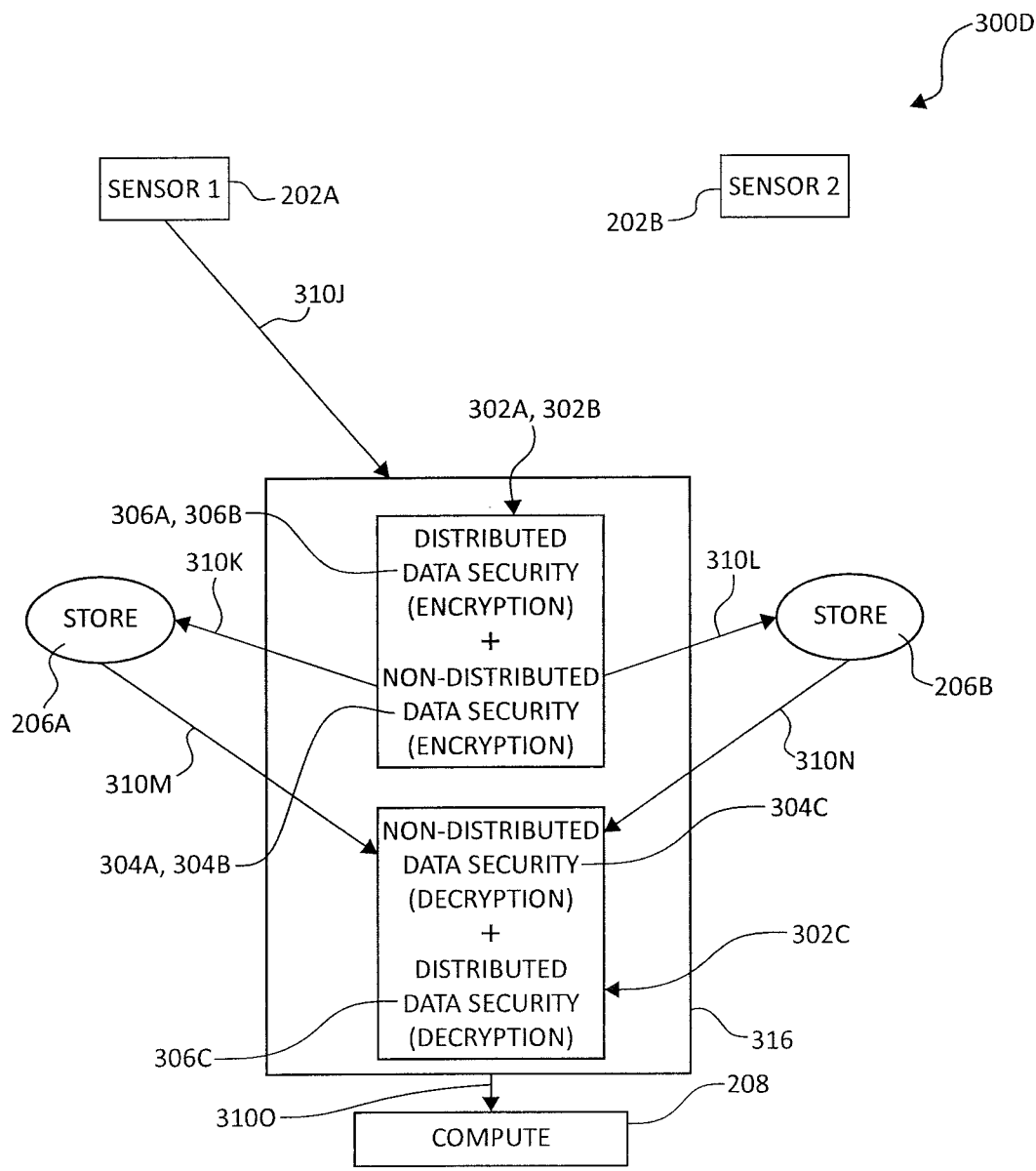

In the architecture 300D shown in FIG. 3D, signals from sensors 202A and 202B are sent to dedicated chip 316 via transmission lines and encryption is carried out at the chip 316, which includes security functions 302A, 302B that carry out encryption, and security functions 302C that carry out decryption. A transmission line (e.g., a secure transmission line) 310J is shown for transmitting signals from sensor 202A to chip 316. However, in the interest of simplification, no transmission line connection from sensor 202B to chip 316 is shown. When encryption of data from sensor 202A is carried out in chip 316, one portion of the encrypted data may be sent to store unit 206A via a transmission line (e.g., a secure transmission line) 310K and another portion of the encrypted data may be sent to store unit 206B via a transmission line (e.g., a secure transmission line) 310L. As in the case of architectures 300A of FIG. 3A, 300B of FIG. 3B and 300C of FIG. 3C, in architecture 300D shown in FIG. 3D, store units 206A and 206B may include secure drives for additional security. When the encrypted data is to be used for processing in architecture 300D shown in FIG. 3D, it is extracted from store units 206A and 206B and sent to chip 316 via transmission lines (e.g., secure transmission lines) 310M and 310N, respectively. The encrypted data is decrypted in chip 316 using security functions 302C, and sent to compute block 208 via a transmission line (e.g., a secure transmission line) 310O. Advantages of implementing encryption in chip 316 include the following:

Sensors, store units, and the compute block are the same as reference architecture shown in FIG. 2B. All added complexity is at the dedicated chip for distributed data security, and yields a modular system design opportunity.

Disadvantages of implementing encryption in chip 316 include the following:

Whole sensor data is sent through the transmission lines without distributed data security, and therefore the data is vulnerable to attack at various points.
    Extra data transmission between other blocks/units and the dedicated chip is employed, which may result in increases in bandwidth.

Figure 4A:
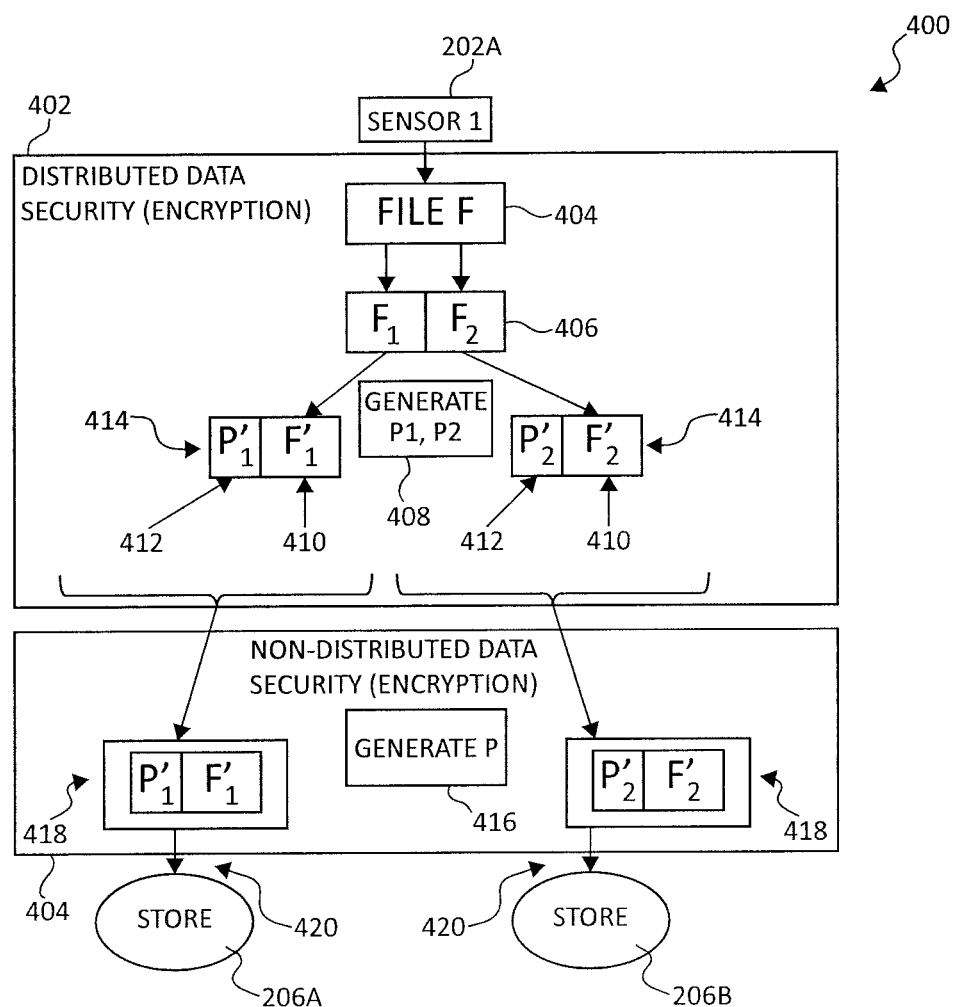
FIG. 4A is a simplified block diagram of an encryption algorithm in accordance with one embodiment.

FIG. 4A is a simplified block diagram of an encryption algorithm 400 that may be performed while data captured by sensors is being stored. FIG. 4A illustrates a specific case of two store units 206A and 206B, as shown in FIGS. 3A-3D. In encryption algorithm 400 of FIG. 4A, distributed data security encryption 402 is first carried out, and then non-distributed data security encryption 404 is performed.

Distributed data security encryption 402 involves, at 404, obtaining a chunk of user data F, from an operating system level, to be saved. At 406, the user data chunk F is partitioned into X data sectors $F_i$ to be written onto X number of distributed storage elements, with X being two in FIG. 4A. Partitioning may be carried out in different ways, for example:

Dividing the used data chunk into portions (e.g., two equal portions) without any partitioning criteria.
    Partitioning in terms of spatial coordinates; for example, dividing a picture in half by dividing horizontally, vertically, diagonally, or extracting features and dividing them accordingly (for example dividing numbers, faces, etc.).

Partitioning in terms of temporal coordinates (e.g., sending every other capture to one node).

Partitioning in terms of colors.

Partitioning in terms of different resolutions based on various transform (Fourier, Wavelet, etc.) domain components.

It should be noted that the above-listed techniques for portioning the user data chunk are only examples, and, in general, partitioning maybe carried out in any suitable manner.

At 408, X different random keys $P_1, P_2, \ldots P_x$ are identified based on a desired entropy targeted for random keys. In the example shown in FIG. 4A, first and second random keys ($P_1$ and $P_2$) are generated. At 410, $F_i$ is secured by encrypting it with the X−1 local keys other than the $i^{th}$ key to obtain $F_i'$. In the example of FIG. 4A, the first data sector ($F_1$) is encrypted with the second random key ($P_2$) to obtain $F_1'$, and the second data sector ($F_2$) is encrypted with the first random key ($P_1$) to obtain $F_2'$. At 412, the key $P_i$ is encoded with available powerful channel codes (repetition codes are an example of a very simple code that may be used if format efficiency is not a problem) to impose more protection against severe channel errors. Encoded key $P_i$ is represented by $P_i'$. In the example of FIG. 4A, $P_1$ and $P_2$ and separately encoded with powerful channel codes. The reason for encoding the different keys (e.g., $P_1$ and $P_2$) is to protect against the loss of any keys. Different embodiments of the disclosure substantially depend on the reliable extraction/recovery of keys (e.g., $P_1$ and $P_2$) from system nodes. Thus, in embodiments of the disclosure, channel codes are selected to match system noise and impurities, and the keys are protected by the selected channel codes to ensure reliability. At 414, fields $P_i'$ and $F_i'$ are appended together (e.g., in FIG. 4A, $P_1'$ and $F_1'$, and $P_2'$ and $F_2'$, are appended together).

Non-distributed data security encryption 404 involves, at 416, identifying a random key P based on desired entropy. As 418, the output data from 402 is input into 404 is secured by encrypting it with the identified random key P (e.g. $P_1'F_1'$, and $P_2'F_2'$ are separately encrypted with the identified random key P). At 420, the output of 404 is sent to the store units to be written (e.g., $P_1'F_1'$ encrypted with P is sent to store unit 206A and $P_2'F_2'$ encrypted with P is sent to store unit 206B). In some embodiments, the system may have independent security protocols at the drive level and transmission lines.

Figure 4B:
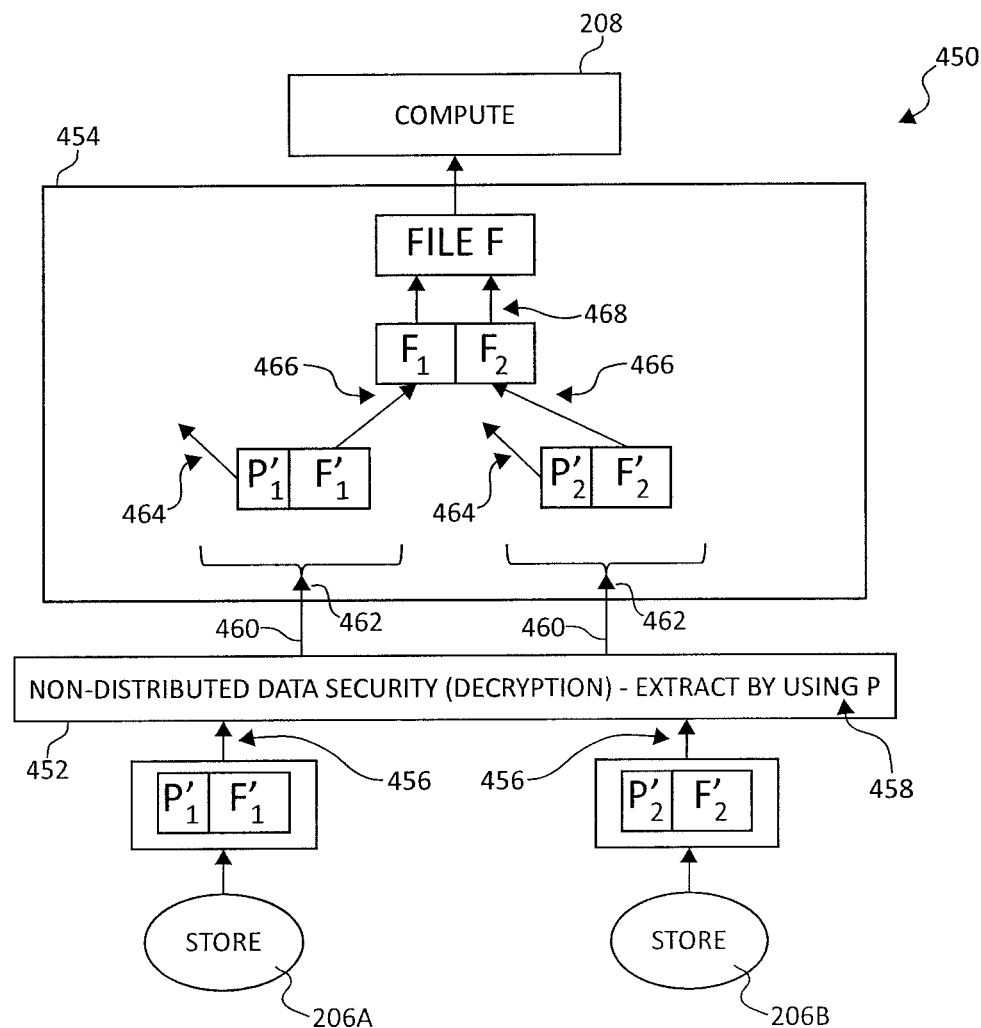
FIG. 4B is a simplified block diagram of a decryption algorithm in accordance with one embodiment.

FIG. 4B is a simplified block diagram of a decryption algorithm 450 that may be performed while data is being retrieved from store units. FIG. 4B illustrates a specific case of data retrieval from two store units 206A and 206B, as shown in FIGS. 3A-3D. In decryption algorithm 400 of FIG. 4B, non-distributed data security decryption 452 is first carried out, and then distributed data security decryption 454 is performed.

Non-distributed data security decryption 452 involves, at 456, receiving files from the store units (e.g., file $P_1'F_1'$ encrypted with P from store unit 206A and file $P_2'F_2'$ encrypted with P from store unit 206B). At 458, the received files are decrypted to extract $P_i'$, $F_i'$ fields (e.g., $P_1'F_1'$ and $P_2'F_2'$) within each file. At 460, the output of 452 (e.g., $P_1'F_1'$ and $P_2'F_2'$) is sent to distributed data security decryption unit 454.

Distributed data security decryption 454 involves, at 462, receiving all the files with all the extracted $P_i'$, $F_i'$ fields (e.g., $P_1'F_1'$ and $P_2'F_2'$ for X=2). At 464, the $P_i'$ fields are decoded to obtain $P_i$ values. Thereafter, at 466, X−1 secret keys other than $P_i$ are used to extract the user information $F_i$ from the received data sectors. At 468, the user data pieces $F_i$ (e.g., $F_1$ and $F_2$) are sent to the operating system.

It should be noted that, in embodiments of the disclosure, it is ensured that the distributed data security system operates with other independent security protocols at the drive level and transmission lines.

The embodiments described above in connection with FIGS. 3A-3D are example architectures, and a number of generalizations can be designed without deviating from the spirit of the disclosure. For example, some generalizations may include:

In FIGS. 3A-3D, it is shown that the data for sensor 202A and sensor 202B are stored in the same store units. However, the second store unit for the sensors may be any other store unit within the system.

FIGS. 3A-3D and 4A also show that the File F is divided into two and written in two store units. Based on the bandwidth employed, the portion to be saved versus transferred can vary between 0% and 100%. For example, if 100% is to be saved, there will be no $F_2$ and only the key $P_2$ will be transferred along with a field.

As is also mentioned in the algorithm descriptions, the number of drives to save single sensor data may be more than two.

The disclosure focuses on distributed data security within any edge applications. However, the distributed data security system may operate well with already existing data security protocols which may be available (e.g., secure drives, secure transmission lines, etc.), and provides an extra layer of security in the presence of an ever growing number of edge nodes distributed throughout the system.

Figure 5:
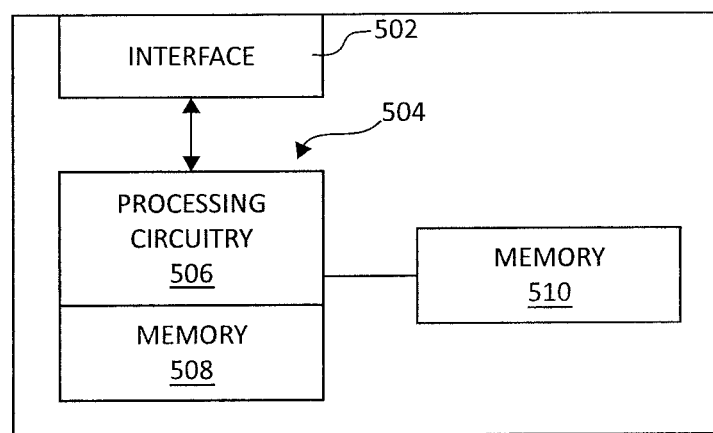
FIG. 5 is a simplified block diagram of an example apparatus in which encryption and decryption operations may be carried in accordance with embodiments of the disclosure.

FIG. 5 is a simplified block diagram of an example apparatus 500 in which encryption and decryption operations may be carried in accordance with embodiments of the disclosure. The apparatus includes an interface 502, a control circuit 504 that includes processing circuitry 506 and one or more memories 508 that may store instructions for the processing circuitry 506 to carry out the above-described encryption and decryption operations. Apparatus 500 may further include one or more additional memories 510 for storing received and/or generated data.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
partitioning a received data chunk into first and second data sectors to be stored in respective first and second store units;
generating first and second random keys;
encrypting the first data sector with the second random key, and encrypting the second data sector with the first random key;
encoding the first and second random keys with channel codes;
appending the first encoded random key to the first encrypted data sector to obtain first appended data, and appending the second encoded random key to the second encrypted data sector to obtain second appended data; and
separately encrypting each of the first and the second appended data using a same third random key to obtain a first encrypted appended data file and a second encrypted appended data file.

2. The method of claim 1 and further comprising, prior to the partitioning, selecting the first and the second store units from a plurality of available store units.

3. The method of claim 1 and wherein partitioning the received data chunk into the first and the second data sectors comprises applying at least one of a plurality of partitioning criteria to separate the received data chunk into the first and the second data sectors.

4. The method of claim 1 and further comprising:
storing the first encrypted appended data file in the first store unit; and
storing the second encrypted appended data file in the second store unit.

5. The method of claim 4 and further comprising:
obtaining the first encrypted appended data file form the first store unit;
obtaining the second encrypted appended data file from the second store unit;
decrypting the first encrypted appended data file to obtain the first encoded random key and the first encrypted data sector; and
decrypting the second encrypted appended data file to obtain the second encoded random key and the second encrypted data sector.

6. The method of claim 5 and further comprising:
receiving, in a distributed data security module, the first encoded random key, the first encrypted data sector, the second encoded random key, and the second encrypted data sector;
decoding the first encoded random key and the second encoded random key.

7. The method of claim 6 and further comprising:
extracting the first data sector utilizing the second random key; and
extracting the second data sector utilizing the first random key.

8. An apparatus comprising:
an interface; and
a control circuit configured to receive a data chunk via the interface and further configured to:
partition the received data chunk into first and second data sectors to be stored in respective first and second store units;
generate first and second random keys;
encrypt the first data sector with the second random key, and encrypt the second data sector with the first random key;
encode the first and second random keys with channel codes;
append the first encoded random key to the first encrypted data sector to obtain first appended data, and append the second encoded random key to the second encrypted data sector to obtain second appended data; and
separately encrypt each of the first and the second appended data using a same third random key to obtain a first encrypted appended data file and a second encrypted appended data file.

9. The apparatus of claim 8 and wherein the control circuit is further configured to:
store the first encrypted appended data file in the first store unit; and
store the second encrypted appended data file in the second store unit.

10. The apparatus of claim 9 and wherein the control circuit is further configured to:
obtain the first encrypted appended data file form the first store unit;
obtain the second encrypted appended data file from the second store unit;
decrypt the first encrypted appended data file to obtain the first encoded random key and the first encrypted data sector; and
decrypt the second encrypted appended data file to obtain the second encoded random key and the second encrypted data sector.

11. The apparatus of claim 10 and wherein the control circuit is further configured to decode the first encoded random key and the second encoded random key.

12. The apparatus of claim 11 and wherein the control circuit is further configured to:
extract the first data sector utilizing the second random key; and
extract the second data sector utilizing the first random key.

13. A computer-readable memory storing executable instructions that, when executed by a processor, cause the processor to:

partition a received data chunk into first and second data sectors to be stored in respective first and second store units;

generate first and second random keys;

encrypt the first data sector with the second random key, and encrypt the second data sector with the first random key;

encode the first and second random keys with channel codes;

append the first encoded random key to the first encrypted data sector to obtain first appended data, and append the second encoded random key to the second encrypted data sector to obtain second appended data; and separately encrypt each of the first and the second appended data using a same third random key to obtain a first encrypted appended data file and a second encrypted appended data file.

14. The computer-readable memory of claim 13 and wherein the executable instructions further cause the processor to, prior to the partitioning, select the first and the second store units from a plurality of available store units.

15. The computer-readable memory of claim 13 and wherein the executable instructions further cause the processor to partition the received data chunk into the first and the second data sectors by applying at least one of a plurality of partitioning criteria to separate the received data chunk into the first and the second data sectors.

16. The computer-readable memory of claim 13 and wherein the executable instructions further cause the processor to:

store the first encrypted appended data file in the first store unit; and store the second encrypted appended data file in the second store unit.

17. The computer-readable memory of claim 16 and wherein the executable instructions further cause the processor to:

obtain the first encrypted appended data file form the first store unit;

obtain the second encrypted appended data file from the second store unit;

decrypt the first encrypted appended data file to obtain the first encoded random key and the first encrypted data sector; and decrypt the second encrypted appended data file to obtain the second encoded random key and the second encrypted data sector.

\* \* \* \* \*